Figure 1:
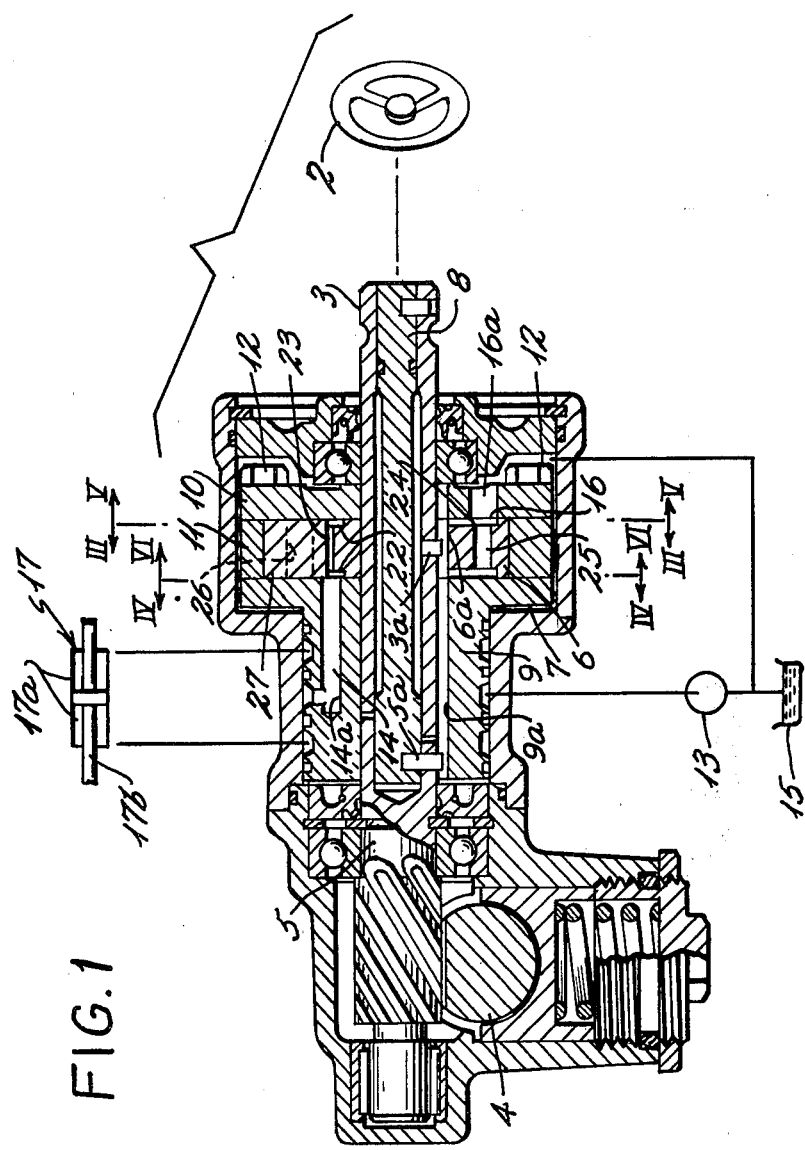

United States Patent [19]

Nishikawa et al.

[11] 4,369,695

[45] Jan. 25, 1983

[54] POWER STEERING APPARATUS FOR VEHICLE

[75] Inventors: Masao Nishikawa, Niiza; Yoshihiko Toshimitsu; Takashi Aoki, both of Asaka, all of Japan

[73] Assignee: Honda Giken Kogyo Kabushiki Kaisha, Japan

[21] Appl. No.: 171,015

[22] Filed: Jul. 21, 1980

Related U.S. Application Data

[62] Division of Ser. No. 928,076, Jul. 26, 1978, Pat. No. 4,240,331.

[30] Foreign Application Priority Data

Jul. 29, 1977 [JP] Japan .................................. 52/90261
Jul. 29, 1977 [JP] Japan .................................. 52/90262

[51] Int. Cl.³ ............................................. F15B 9/08
[52] U.S. Cl. ..................................... 91/375 A; 91/467; 137/625.21
[58] Field of Search ............................ 91/467, 375 A; 137/625.23, 625.21; 251/175, 192

[56] References Cited

U.S. PATENT DOCUMENTS

| 3,360,932 | 1/1968 | Lech et al. | 91/467 X |
| 3,616,727 | 11/1971 | Suzuki et al. | 91/375 A |
| 3,799,201 | 3/1974 | Hansen et al. | 137/625.21 |
| 3,829,258 | 8/1974 | Easton | 137/625.21 |

Primary Examiner—George L. Walton
Attorney, Agent, or Firm—Armstrong, Nikaido, Marmelstein & Kubovcik

[57] ABSTRACT

A power steering apparatus for a vehicle comprising a valve housing provided with a rotary type valve body rotatable in one direction or another by a turning operation of a steering shaft. An oil supply port is connected to an oil pressure pump that is selectively connected to either of one or another of cylinder ports connected to respective left and right chambers of a power cylinder. The valve body is provided with an intermediate partition plate extending into an oil pressure reaction chamber in the valve housing to divide the chamber into areas on opposite sides of the partition plate. The resultant pair of areas extend respectively on either side in the turning direction of the valve body, and the respective areas are connected to one or the other of the cylinder ports.

1 Claim, 8 Drawing Figures

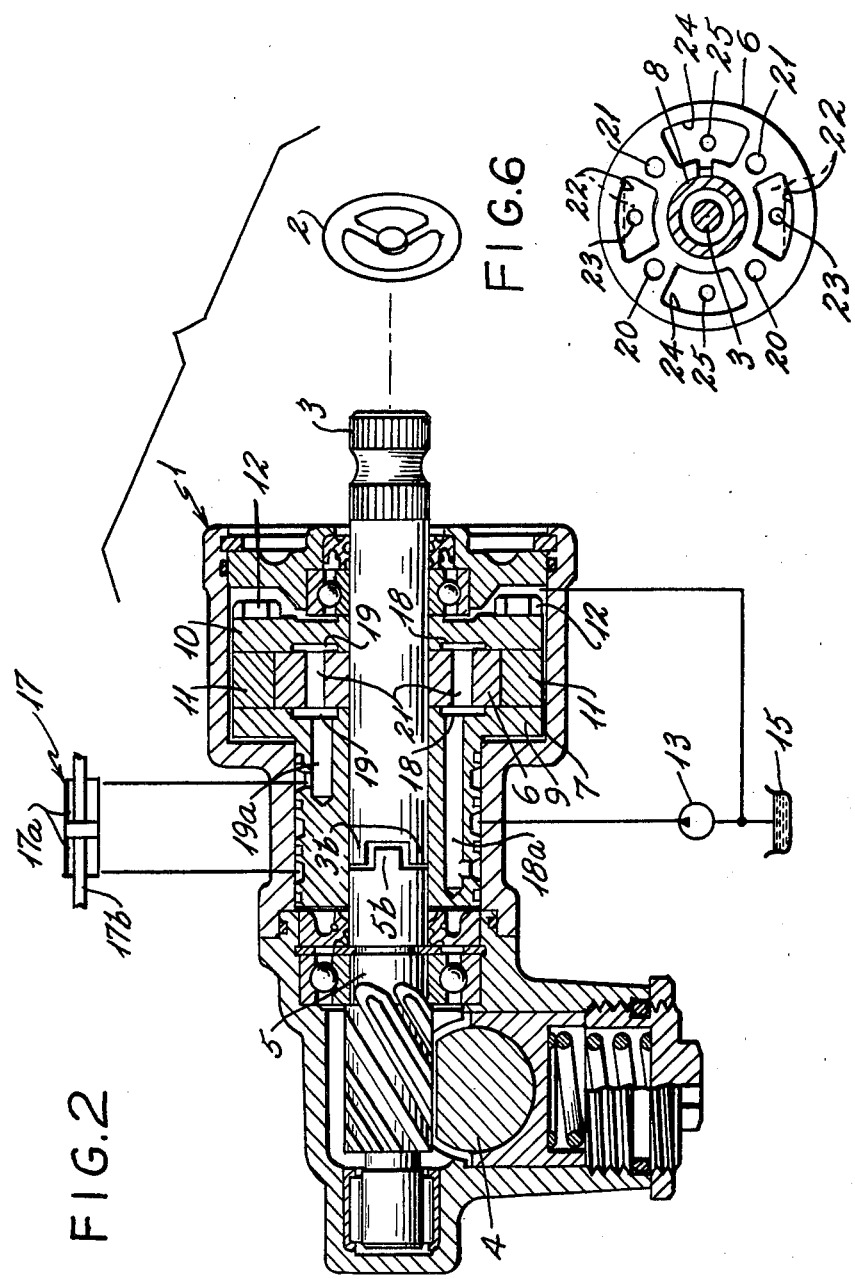

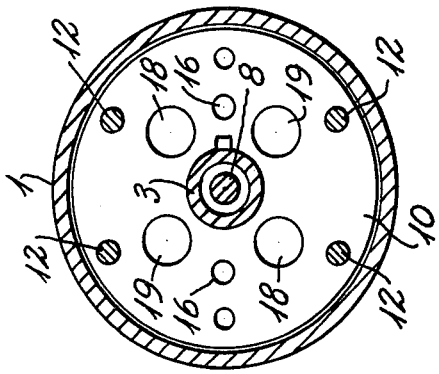
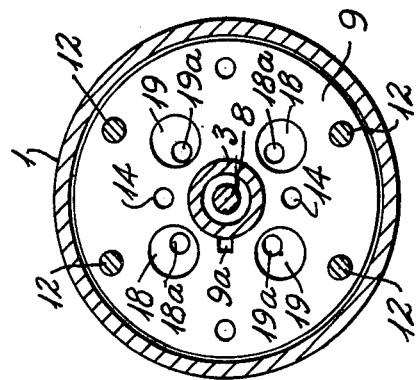
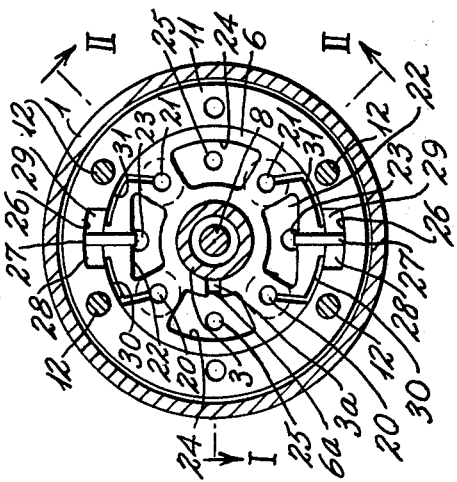

POWER STEERING APPARATUS FOR VEHICLE

This is a division of application Ser. No. 928,076, filed July 26, 1978, now U.S. Pat. No. 4,240,331.

BACKGROUND OF THE INVENTION

This invention relates to a power steering apparatus for a vehicle with a so-called rotary type changeover valve having a valve housing provided therein with a rotary type valve body arranged to be turned in either one direction or another by a turning operation of a steering shaft. An oil supply port is connected to an oil pressure pump and is selectively connected to either one or the other of cylinder ports connected to left and right chambers, respectively, of a power cylinder.

It has been usual hitherto with this kind of apparatus that it is provided with such an oil pressure reaction chamber mechanism that, at the time of power assistance caused by supply of the pressure oil to the power cylinder, that the changeover valve be pushed back towards its neutral position by oil pressure corresponding to a road surface resistance (a steering reaction force acting on a tire) generated at the cylinder. Thereby a driver can be given a steering feeling in proportion to the road surface resistance. If, for this purpose, a spool type valve is used as the changeover valve, an oil pressure reaction chamber can be formed by using the front and rear end portions in the slide movement direction of the spool valve body as pressure receiving surfaces, so that the oil pressure reaction chamber can be formed comparatively small in size and simple in construction. If, however, a rotary type valve is used as the changeover valve, because the rotary type valve body itself does not have any pressure receiving surface for returning it towards its neutral position, pressure receiving surfaces and an oil pressure reaction chamber have to be provided separately therefrom, so that the apparatus is liable to become large in size and complicated in construction, and thus there has not been proposed as yet any one suitable for practical use.

SUMMARY OF THE INVENTION

The main object of the present invention is to overcome the deficiencies of the prior art.

Another object of the invention is to provide an apparatus having an oil pressure reaction chamber which is small in size, simple in construction and suitable for practical use.

According to the present invention, a valve housing is provided with a rotary type valve body arranged to be turned in either one direction or another by a turning operation of a steering shaft. An oil supply port connected to an oil pressure pump is selectively connected to either of one or the other of cylinder ports connected to respective left and right chambers of a power cylinder, and the invention is characterized in that the valve housing is provided with an oil pressure reaction chamber and intermediate partition plate extends from the valve body to divide the oil pressure reaction chamber into a pair of areas extending on one side and the other side in the turning direction of the valve body. The respective areas are connected respectively to one or another of the cylinder ports.

Another feature of the invention provides an arrangement as mentioned above, which has both a damper function for damping a chattering vibration of the valve body caused on return turning operation of the steering shaft and a valve function for intercommunicating, on manual steering operation under engine stoppage conditions or the like, between the two chambers of the power cylinder. This thereby prevents generation of a negative pressure in the chamber on the expanded side of the cylinder, and is characterized in that the partition plate is constructed of an oil pressure responsive type that the same is advanced into and retreated from the oil pressure reaction chamber in response to the oil pressure acting on the oil supply port.

It has been also usual hitherto with this kind of apparatus that, in order to prevent any hindrance to the turning operation of the valve body that is caused when the valve body is acted on by a side pressure force of an oil pressure acting on the oil supply port or additionally the cylinder ports, pressure receiving surfaces receiving the oil pressure are so formed on one side and the other side of the valve body as to be interconnected through an opening made through the valve body and be equal in area to one another. Thereby, side pressures can be balanced to one another at the opposite pressure receiving surfaces of the valve body. However, the rotary type changeover valve is originally good in input and output characteristics, so that if the side pressures are balanced and the valve body is made smooth in turning movement as mentioned above, a chattering vibration of the valve body is liable to be made at the time return turning operation of the steering shaft. For preventing this phenomenon, it has been also hitherto known that a damper such as plunger piston or the like is interposed between the valve body and the valve housing, but this is inconvenient in that the apparatus becomes large in size and high in price.

Still another feature of the invention provides an apparatus free from this inconvenience, and it is characterized in that there is provided a difference in area between the pressure receiving surface on one side of the valve body and the pressure receiving surface on the other side thereof.

Other objects and advantages of the present invention will be better understood with respect to the accompanying specification, claims and drawings.

IN THE DRAWINGS

Many modifications and variations of the present invention are possible in light of the above teachings. It is, therefore, to be understood that within the scope of the appended claims, the invention may be practiced otherwise than as particularly described.

Figure 8:
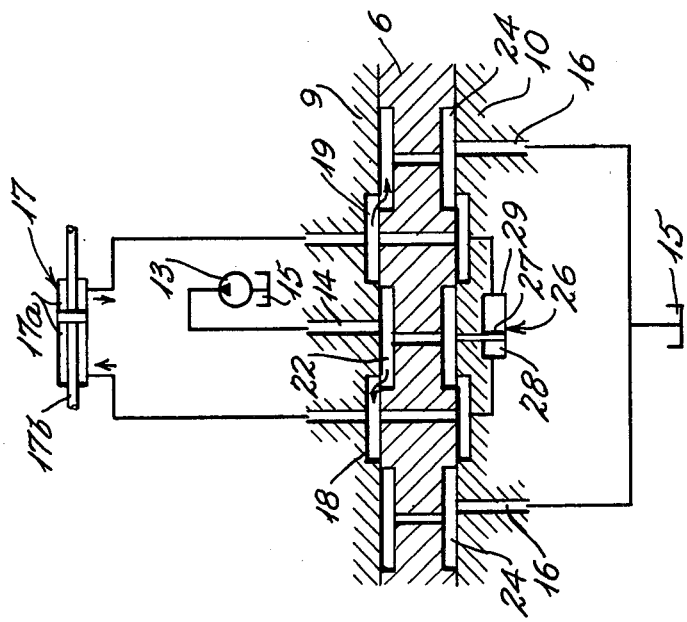
Figure 7:
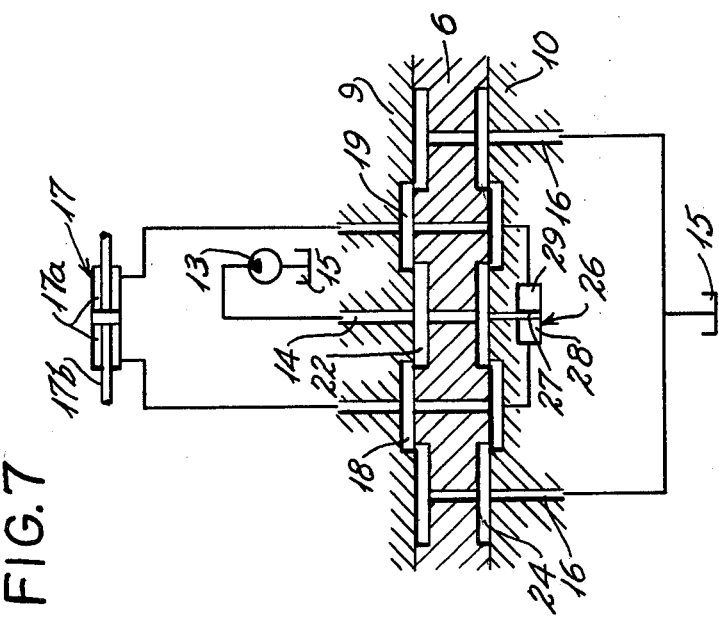

FIG. 1 is a sectional side view of one embodiment of the inventive apparatus, taken along the lines I—I in FIG. 3, FIG. 2 is a sectional side view of the same taken along the line II—II in FIG. 3, FIGS. 3 to 5 are sectional views taken respectively along the lines III—III to V—V in FIG. 1, FIG. 6 is a front view of a valve body portion in a modified embodiment of this invention, and FIGS. 7 and 8 are developed sectional views of a valve portion thereof.

DESCRIPTION OF THE INVENTION

The invention will now be explained with reference to the accompanying drawings:

Referring to the drawings, numeral 1 denotes a machine frame, containing a steering shaft 3 to which is connected a steering wheel 2 of a vehicle. At the end of shaft 3 is a pinion shaft 5 in mesh with a rack 4 connected to front wheels of the vehicle. The shaft 3 and rack 4 are rotatably mounted in the machine frame 1. A valve housing 7 housing a valve body 6 connected to the steering shaft 3 is connected to the pinion shaft 5 and is housed rotatably in the machine frame 1. The steering shaft 3 and the pinion shaft 5 are interconnected by an inner torsion bar 8, so that by a turning operation of the steering shaft 3 to either the left or the right, the pinion shaft 5 is turned to either the left or the right. Hence, the rack 4 is given steering movement to the right or the left, and at the same time torsion is imparted to the torsion bar 8 by the road surface resistance acting on the pinion shaft 5 through the rack 4 and the steering force acting on the steering shaft 3. As a result, the valve 6 connected to the steering shaft 3 is caused to turn relative in the valve housing 7 connected to the pinion shaft 5.

The valve housing 7 is so constructed that front and rear frames 9, 10, hold at the front and rear, dish-shaped valve body 6 connected at its inner peripheral key groove 6a to a pin 3a projecting from the steering shaft 3, and an intermediate frame 11 surrounding the outer periphery of the valve body 6, so that frames 9, 10 and 11 are joined together by means of bolts 12. The valve housing 7 is connected at an inner peripheral key groove 9a of its front side frame 9 to a pin 5a projecting from the torsion bar 8 and extending through the pinion shaft 5.

The valve housing 7 is formed in its front frame 9 with a pair of oil supply ports 14, 14, each being connected through an oil supply opening 14a to an oil pressure pump 13 driven by an external engine, and in its rear frame 10 with a pair of tank ports 16, 16, each being connected through a return opening 16a to an oil tank 15. In this arrangement these pairs of ports are differentiated in angular phase and the openings of each pair are disposed symmetrically as shown in FIG. 4 and FIG. 5. Additionally, as shown in FIG. 4, the valve housing 7 is formed in its front frame 9 with two pairs of cylinder ports 18, 19 and 18, 19, each pair being connected through a pair of oil passage openings 18a, 19a to respective left and right chambers 17a, 17a of a power cylinder 17. In such an arrangement, the ports of each pair are disposed symmetrically on opposite sides of each corresponding oil supply port 14, that is, on the right side and the left side in the turning direction of the valve body 4 as shown clearly in FIG. 4. Additionally, as shown clearly in FIG. 5, the rear frame 10 is also formed with two pairs of cylinder ports 18, 19 which are in communication with respective pairs of ports 18, 19 and 18, 19 and 18, 19 of the front frames 9, through respective openings 20, 21 and 20, 21 in the valve body 6.

As shown clearly in FIG. 1 and FIG. 3, the valve body 6 is formed in its front surface with a pair of oil supply grooves 22, 22 which are ordinarily in communication with the foregoing oil supply ports 14, 14 and has additionally in its rear surface, a pair of oil supply grooves 22, 22 that are in communication with the foregoing pair of grooves 22, 22 through openings 23, 23 through the valve body 6. Additionally, the valve body 6 is formed in its rear surface with a pair of return grooves 24, 24 which are ordinarily in communication with the foregoing tank ports 16, 16 and has in its front surface a corresponding pair of return grooves 24, 24 which are in communication therewith through openings 25, 25 through the valve body 6. The arrangement as mentioned above is shown diagrammatically in FIGS. 7 and 8.

In a neutral position of the valve body as illustrated and shown in FIG. 7, the oil supply grooves 22, 22 and the return grooves 24, 24 in each of the front and rear surfaces thereof are overlapped respectively with the cylinder ports 18, 18 and the cylinder ports 19, 19 in each of the front and rear frames 9, 10 of the valve housing 7, so that the oil supply grooves 22, 22 and the return grooves 24, 24 and accordingly, the oil supply ports 14, 14 and the tank ports 16, 16 on each side are in communication with one another through the cylinder ports 18, 18 and 19, 19 on each side. Thus, the valve is constructed to be of an open center type.

If the valve body 6 is turned, in either direction, as shown in FIG. 8, the oil supply grooves 22, 22 and the return grooves 24, 24 on each side thereof are so selected as to be connected to either one of the cylinder ports 18, 18 and 19, 19 respectively, depending on its turning direction, so that the chamber 17a on one side of the power cylinder 17 is supplied with pressurized oil from the oil pressure pump 13 and thus a piston 17b of the power cylinder 17 connected to the rack 4 is moved and a predetermined power assistance is given to a manual steering.

Referring to the drawings, an oil pressure reaction chamber 26 is formed in such a manner that the inner periphery of the intermediate frame 11 of the valve housing 7 is concave at a portion thereof extending over a short length in the circumferential direction thereof, and the reaction chamber 26 is provided at its middle portion with a partition plate 27 extending from the valve body 6, and thereby the chamber 26 is partitioned into a pair of left and right areas 28, 29 extending in the turning direction of the valve body 6. The left area 28 and the right area 29 are connected respectively to the left cylinder port 18 and the right cylinder port 19 through oil passages 30, 31 extending respectively from the openings 20, 21, so that by turning of the valve body 6 in one direction, for instance, to the left, the volume of the left area 28 connected to the left cylinder port 18 through the oil supply groove 22, is decreased due to the turning of the partition plate 27 to the left, and at the same time the oil pressure acting on the cylinder port 18 is introduced into the left area 28, and thus the partition plate 27 and accordingly the valve body 6, is acted upon by a rightward pushing force of this oil pressure for returning the same to its neutral position.

The partition plate 27 is arranged to be free to project and retract in relation to the valve body 6 and is exposed at its inner end portion to the opening 23 formed for intercommunication between the front and rear oil supply grooves 22, 22 of the valve body 6, so that if the oil pressure is applied to the oil support port 14, the oil pressure acts on the inner end portion of the partition plate 27 through the oil supply groove 22 and the opening 23, and thereby the partition plate 27 is projected or urged toward the oil pressure reaction chamber 26. In the illustrated embodiment, two pairs of oil pressure reaction chambers 26 and partition plates 27 are so arranged as to be disposed symmetrically in relation to the center axial line.

Referring to FIG. 2 of the drawings, numerals 3b, 5b denote engaging projections projecting from the steering shaft 3 and the pinion shaft 5 with a predetermined gap left therebetween in order to prevent overtorsioning of the torsion bar 8.

By turning operation of the steering shaft 3 in one direction, for instance, to the left as mentioned before, the valve body 6 is given a relative turning movement to the left in the valve housing 7, and is so changed over that the left cylinder port 18 connected to the left chamber 17a of the power cylinder 17 and the right cylinder port 19 connected to the right chamber 17a thereof are selected to connect to the oil supply groove 22 and the return groove 24 respectively, whereby the left chamber 17a is supplied with pressurized oil from the oil pressure pump 13 and a predetermined power assistance is given to a manual steering. At that time, the left chamber 17a and accordingly the left area 28 of the oil pressure reaction chamber 26 connected thereto through the left cylinder port 18 is acted on by an oil pressure corresponding to a road surface resistance. Consequently, the valve body 6 is pushed to the right, as mentioned before, through the partition plate 27, and thus the force necessary for keeping the valve body 6 in the left side steering position against this pushing force, and accordingly, the steering operation force acting on the steering shaft 3, is varied with the foregoing oil pressure. The road surface resistance, and thus the driver can be given a steering feeling in proportion to the road surface resistance.

In the above case, the oil supply port 14 is also acted upon by oil pressure corresponding to the road surface resistance, and the partition plate 27 is pushed by this oil pressure, into the oil pressure reaction chamber 26, as mentioned previously, and thus the same is brought into pressure contact at its outer end portion with the chamber wall of the reaction chamber 26, so that the left and right areas 28, 29 are completely sealed off thereby, and leaking of the pressurized oil from the left area 28 to the right area 29 can be prevented. Additionally, even where a chattering vibration is made at the valve body 6 on return turning operation of the steering shaft 3, the oil pressure generated in the oil supply port 14 by this vibration serves, similarly as mentioned above, to bring the outer end portion of the partition plate 27 into pressure contact with the chamber wall of the reaction chamber 26, and thus the chattering vibration is effectively damped or decreased by the friction force between the two.

In the case of manual steering under inoperative conditions of the oil pressure pump 13 caused by engine stoppage or the like, by turning of the steering shaft 3, to the left, for instance, similarly as above, (the left cylinder port 18 and the right cylinder port 19 are connected to the oil supply groove 22 and the return groove 24, respectively), the oil within the right chamber 17a is urged out into the oil tank 15 through the tank port 16 by the right movement of the piston 17b of the power cylinder 17 connected to the rack 15. On this occasion, the left chamber 17a is not supplied with any pressure oil from the oil pressure pump 13, and the chamber 17a is expanded by rightwards movement of the piston 17b, and thereby a negative pressure is generated therein, and the force for a steering operation is increased.

On this occasion, as a result of generation of this negative pressure, the oil supply port 14 connected to the chamber 17a is acted on also by the negative pressure, and the partition plate 27 is urged thereby toward the valve body 6 side and retreats inwardly, so that the left and right areas 28, 29 of the oil pressure reaction chamber 26 and accordingly the right and left chambers 17a, 17a of the power cylinder 17 connected thereto through the cylinder ports 18, 19 are brought into communication with one another, and thereby the generation of the subsequent negative pressure at the left chamber 17a is effectively prevented and in turn an increase in the subsequent steering operation force is prevented.

By turning the steering shaft 3 to the right, the valve body 6 turns to the right, and in reverse to the foregoing case, the right cylinder port 19 is connected to the oil supply groove 22 and the left cylinder port 18 is connected to the return groove 24, and thus almost the same operation as above can be effected.

In a modified embodiment of this invention, the pressure receiving surfaces on both sides of the valve body 6 are differentiated. Namely, for instance, the front oil supply grooves 22, 22 are formed to be somewhat larger in area than the rear oil supply grooves 22, 22 as shown by dotted lines in FIG. 6. Thus, it is contemplated that when an oil pressure is generated in the oil supply ports 14, 14, the valve body 6 can be brougnt into pressure contact with the rear frame 10 by a pushing force corresponding to a difference in area between the front oil supply grooves 22, 22 and the rear grooves 22, 22. If the chattering vibration is generated at the valve body 6 on return turning operation of the steering shaft 3, fluctuated high and low oil pressures by the chattering are generated in the oil supply ports 14, 14 or additionally, for instance, in the cylinder ports 18, 18 and 18, 18. In this case, the valve body 6 is repeatedly brought into pressure contact with the rear frame 10 similarly as above by the pushing force corresponding to the difference in area every time when the oil pressure becomes high. Thus, the chattering vibration can be effectively decreased by a friction force between the valve body 6 and the rear frame 10.

Almost the same purpose as above can be achieved in that, instead of providing a difference in area between the front oil supply grooves and the rear oil supply grooves, there is provided a difference in area between the front cylinder ports 18, 18 and the rear ports 18, 18 or between the front cylinder ports 19, 19 and the rear ports 19, 19.

Thus, according to this invention, the oil pressure reaction chamber formed in the valve housing is partitioned into a pair of areas extending on both sides in the turning direction of the valve body by the partition plate extending from the valve body, and either of the areas and is selectively connected to either of the cylinder ports connected to the oil supply port by turning in either one direction and the other of the valve body. By the turning of the valve body, the valve body is subjected to a pushing force for returning the same toward its neutral position between the valve body and the valve housing as in the conventional apparatus. Hence, the apparatus can be made smaller in size and lower in price, and additionally the pushing force acting on the valve body can be maintained to be of a comparatively small value corresponding to a small difference between the front and rear pressure receiving surfaces, so that there is not brought about any problems in the turning operation of the valve body.

What is claimed is:

1. A rotary valve in combination with a power steering apparatus for a vehicle having a steering shaft, said rotary valve comprising a valve housing, a rotary type valve body in said housing arranged to be turned in either one direction or the other by turning operation of said steering shaft, an oil supply port in said housing connected to an oil pressure pump, and two cylinder ports in said housing connected to respective left and right chambers of a power cylinder, said valve body selectively connecting said oil supply port to either of said cylinder ports, said valve body having an opening therethrough for passing oil pressure from said oil supply port to the selected cylinder port and two non-annular pressure receiving surfaces formed in opposite faces of said valve body surrounding said opening, one of the pressure receiving surfaces is positioned immediately downstream of said oil pressure pump having a larger surface area than the other pressure receiving surface and said oil pressure acts solely on the pressure receiving surfaces which allows the valve to remain fixed axially along the steering shaft as the oil pressure acts on the larger receiving surface to prevent chattering.

* * * * *